United States Patent
Wong et al.

(10) Patent No.: US 9,617,401 B2
(45) Date of Patent: *Apr. 11, 2017

(54) PYROLYTIC CARBON BLACK AND POLYMER COMPOSITES MANUFACTURED THEREFROM

(71) Applicant: BERDEKO TECHNOLOGIES INC., Ottawa (CA)

(72) Inventors: Vincent W. Y. Wong, Dunrobin (CA); Rui Resendes, Kingston (CA); Timothy James Clark, Kingston (CA)

(73) Assignee: Berdeko Technologies Inc., Ottowa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,330

(22) Filed: Oct. 27, 2014

(65) Prior Publication Data

US 2015/0045497 A1 Feb. 12, 2015

Related U.S. Application Data

(63) Continuation of application No. 13/775,134, filed on Feb. 23, 2013, now Pat. No. 8,871,840.

(60) Provisional application No. 61/602,864, filed on Feb. 24, 2012.

(51) Int. Cl.

| C08K 3/04 | (2006.01) |
|---|---|
| C01B 31/00 | (2006.01) |
| C08J 3/22 | (2006.01) |
| C08L 7/00 | (2006.01) |
| C08L 9/00 | (2006.01) |
| C08L 9/02 | (2006.01) |
| C08L 9/06 | (2006.01) |
| C08L 23/16 | (2006.01) |
| C09C 1/48 | (2006.01) |

(52) U.S. Cl.
CPC ............... *C08K 3/04* (2013.01); *C08J 3/226* (2013.01); *C08L 7/00* (2013.01); *C08L 9/00* (2013.01); *C08L 9/02* (2013.01); *C08L 9/06* (2013.01); *C08L 23/16* (2013.01); *C09C 1/48* (2013.01); *C01P 2004/61* (2013.01); *C01P 2006/80* (2013.01)

(58) Field of Classification Search
CPC ................................... C08K 3/00; C08K 3/04
See application file for complete search history.

(56) References Cited

U.S. PATENT DOCUMENTS

| 8,871,840 B2 * | 10/2014 | Wong ........................ C08K 3/04 521/40 |
|---|---|---|
| 2010/0249353 A1 | 9/2010 | MacIntosh |
| 2011/0076608 A1 * | 3/2011 | Bergemann ............... C09C 1/56 430/108.9 |
| 2011/0200518 A1 | 8/2011 | MacIntosh |

OTHER PUBLICATIONS

NIST database homepage at http://srdata.nist.gov/xps referred to in paragraph [0068] of specification.
USPTO Office Action of Oct. 9, 2013 in related U.S. Appl. No. 13/775,134.
USPTO Office Action of Mar. 28, 2014 in related U.S. Appl. No. 13/775,134.

* cited by examiner

*Primary Examiner* — Robert Harlan
(74) *Attorney, Agent, or Firm* — Young Law Firm, P.C.

(57) ABSTRACT

The present application provides a polymer composite comprising at least one polymer and a reclaimed pyrolyzed carbon black (pCB), wherein the pCB comprises less than about 10 μg/g of polycyclic aromatic hydrocarbons (PAH). Also provided are polymer composite and consumer-ready formulations of the low PAH pCB and methods of manufacturing such composites and formulations.

16 Claims, 7 Drawing Sheets

PYROLYTIC CARBON BLACK AND POLYMER COMPOSITES MANUFACTURED THEREFROM

FIELD OF THE INVENTION

The present application pertains to the field of carbon black. More particularly, the present application relates to reclaimed pyrolytic carbon black and the use of the reclaimed pyrolytic carbon black in the manufacture of polymer composites.

INTRODUCTION

Carbon black is used as a filler, pigment and/or reinforcing material in polymer composites, for example, in rubbers and in plastic masterbatches. Manufacturers require consistent quality and consistency in the carbon black. Price is also a major factor when selecting a carbon black. Tire companies and compounders do, however, require that parameters, such as dispersive properties and hardness of the pellet, be met in order to use a particular carbon black in their applications. In addition to these basic requirements, there is a general realization that lack of quality and consistency can be expensive. Quality is increasingly being recognized as an aspect of cost savings and thus as a basis for competition.

As the continuing accumulation of scrap tires has become a major global environmental hazard, there has been an increased focus on processes and methods for reclaiming the components of scrap rubber, including tire rubber. One of the materials reclaimed from rubbers has been carbon black.

However, despite prior art efforts to commercialize pyrolysis technology, it has not yet been achieved in an economically viable way. Although many pyrolysis projects have been proposed, patented, or built over the past decade, none have been commercially successful. Many of these processes are not truly continuous, but are, in at least some aspects or steps, limited to batch processing techniques. As such, they suffer from not being sufficiently scalable to be commercially viable. Others require excessive energy inputs to produce recycled/reclaimed material of sufficiently high quality to permit use in commercial products, with the result that they are not economical. In particular, the products of batch-type tire pyrolysis have limited marketability due to the low quality of their end products as compared to virgin materials. For instance, prior art pyrolytic carbon black (pCB) typically contains too many contaminants for use in new tires. Moreover, with batch pyrolysis techniques, the consistency of the end products may vary with each run. As such, the resulting pCB cannot be used, in the auto, rubber, and other industry sectors, which require a consistent carbon black product. As a result, much of the pCB, arising from existing pyrolysis processes, is used as high grade coal for the fuel industry, as well as for industrial hoses, mats, rooting materials and moldings.

Polycyclic aromatic hydrocarbons ("PAHs") are a large group of organic compounds having at least two fused aromatic rings. Examples of PAHs include naphthalene, anthracene, pyrene, benzofluoranthenes, benzopyrenes, etc. Many PAHs are known to be carcinogenic, mutagenic and/or teratogenic.

PAHs are formed as a result of pyrolytic processes. Not surprisingly, PAHs are formed during the pyrolysis of organic materials such as coal and crude oil and during pyrolysis of rubber and other polymer composites. As a result, both virgin and reclaimed pyrolytic carbon blacks generally include relatively high levels of PAHs. Given the negative health and environmental effects from PAHs, there is increased public and regulatory pressure to reduce PAH levels in carbon blacks, particularly carbon blacks destined for use in the manufacture of plastic materials and articles intended to come into contact with foodstuffs.

A need remains for a pBC that can be reliably incorporated in commercial products, such as polymer composites, as a total or partial replacement for the virgin carbon black presently used in these products. Further, there remains a need for a pCB that has low PAH levels and that can be reliably incorporated in commercial products.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a consumer-ready pyrolytic carbon black and polymer composites manufactured therefrom. In accordance with an aspect of the present application, there is provided a polymer composite comprising at least one polymer and a reclaimed pyrolyzed carbon black (pCB), wherein the pCB comprises less than about 10 µg/g of polycyclic aromatic hydrocarbons (PAH).

In one embodiment, the polymer composite is a rubber composite, such as tire rubber.

In accordance with another aspect of the application, there is provided a consumer-ready pCB. In one embodiment, the consumer-ready pCB is a pCB masterbatch composition comprising a polymer and a pCB, wherein the pCB comprises less than about 10 µg/g of polycyclic aromatic hydrocarbons (PAH).

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION

Figure 1A:
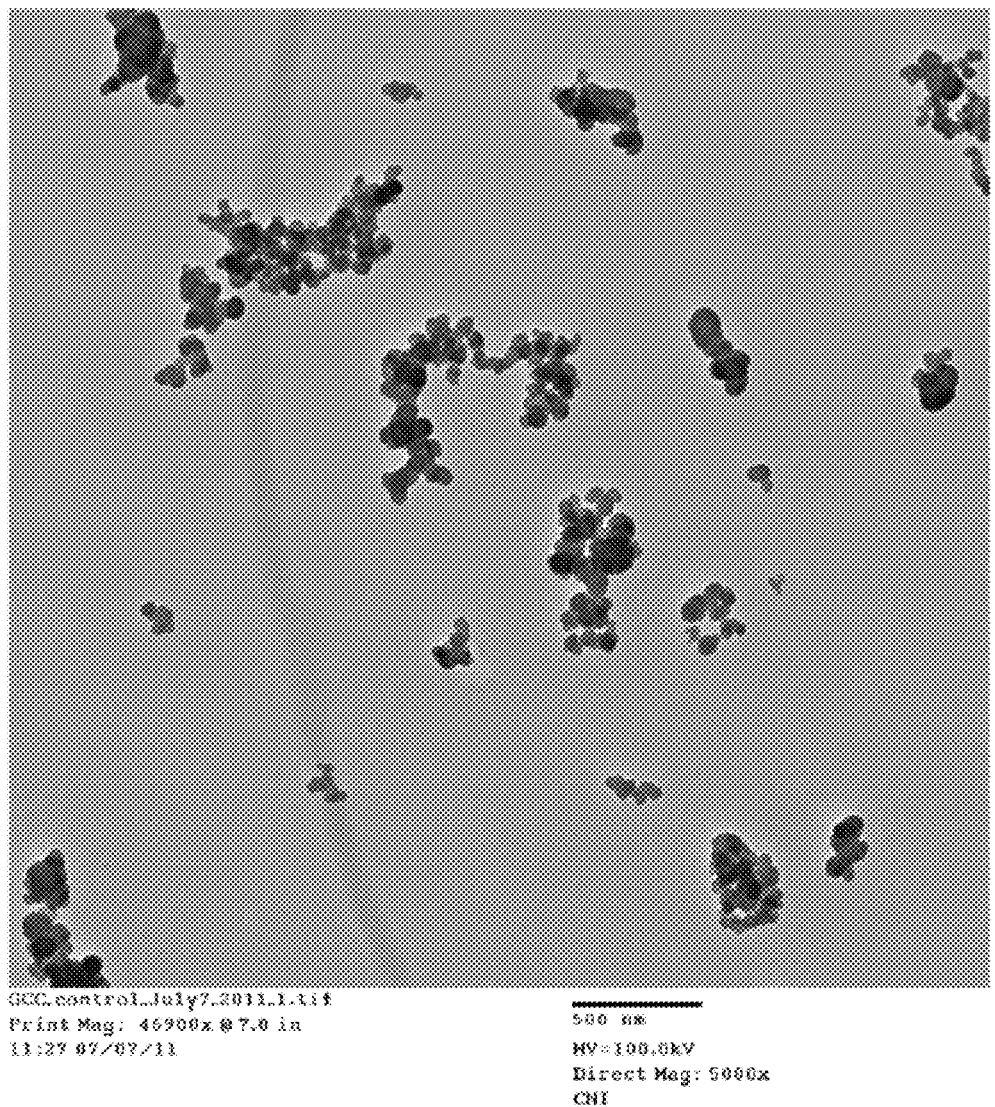
FIGS. 1A and 1B are transmission electron microscopy (TEM) images of vCB-N660 at a direct magnification of 5000×, where the scale bars shown in FIGS. 1A and 1B are 500 nm.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), components) and/or ingredients) as appropriate.

"Carbon black" is virtually pure elemental carbon in the form of colloidal particles that are typically produced by incomplete combustion or thermal decomposition of gaseous or liquid hydrocarbons under controlled conditions.

The terms "virgin carbon black", "furnace carbon black" AND "vCB" as used herein refer to carbon black made from incomplete combustion of heavy petroleum products, such as aromatic oil or natural gas.

The terms "pyrolytic carbon black" or "pyrolyzed carbon black" or "pCB" are used herein to refer to reclaimed carbon black made from pyrolysis of waste polymer composites, such as tire rubber.

U.S. Patent publication No, 2011/0200518 discloses a process for producing a reclaimed pyrolyzed carbon black (pCB) from rubber composites, such as tire rubber. It has now been found that optimization of this process produces pCB with consistent properties, including low volatile content. Importantly, it has now been found that pCB with low levels of polycyclic aromatic hydrocarbons (PAH) can be made from pyrolyzing waste polymer composite (e.g., tire rubber) using the process disclosed in U.S. Patent publication No. 2011/0200518, which is herein incorporated by reference in its entirety.

pCB-Containing Polymer Composites

The present application provides polymer composites comprising at least one polymer and a reclaimed pyrolyzed carbon black (pCB), wherein the pCB comprises less than about 20 µg/g of polycyclic aromatic hydrocarbons (PAH) or, preferably, less than about 10 µg/g of PAH. In certain embodiments, the concentration of PAH in the pCB is 5 µg/g or less. These levels of PAH are, in fact, lower than those found in most virgin carbon blacks. Surprisingly, the present inventors have found that these pCB with the low PAH levels can be used successfully in the manufacture of polymer composites without compromising, or without significantly compromising, the properties (e.g., mechanical and rheometric properties) of the polymer composites.

As described herein, the low PAH levels are determined based on the total concentration of the following sixteen PAHs: naphthalene, acenaphthylene, acenaphthene, fluorene, phenanthrene, anthracene, fluoranthene, pyrene, benzo(a)anthracene, chrysene, benzo(b)fluoranthene, benzo(k)fluoranthene, benzo(a)pyrene, indeno(1,2,3-cd)pyrene, dibenz(a,h)anthracene and benzo(ghi)perylene. The pCB can contain additional PAHs, however, based on the toluene discolouration test, these will also be present at very low concentrations such that they will not significantly affect the total PAH concentration in the pCB. However, it should be understood that when referring to the total PAH amounts in the pCB as disclosed herein, the specific PAH amounts recited relate only to the totals obtained from measuring the amount of the above sixteen PAHs.

Examples of vCB that can be replace in whole, or in part, by the present pCB include, but are not limited to ASTM specification carbon black, such as, but not limited to, a N110, N121, N125, N220, N231, N234, N242, N293, N299, N326, N330, N339, N347, N351, N35S, N375, N539, N550, N630, N650, N660, N683, N762, N765, N774, N787, and/or N990 carbon black. In specific examples, the low PAH pCB described herein, is used to replace all or a portion of an N200, N300, N500, N600 or N700 series vCB.

Polymer composites comprise a polymer and an organic or inorganic filler, or combination of fillers. The polymer composites can include additional components and selection of such additional components would depend on the application of the composite and would be a matter of routine to a worker skilled in the field.

In certain embodiments the low PAH pCB described herein is used as a total replacement of vCB found in current polymer composites. Alternatively, the present pCB is used to replace a portion of the vCB found in current polymer composites, for example, the pCB can be used to replace from 1-99% of the vCB, or from 1-50%, or from 1-25%, or from 5-15%, or about 10%. As shown in the Examples, the pCB exhibits good dispersion within the polymer composites, whether used as the only carbon black or in a mix with one or more other carbon blacks.

The pCB can be used in the same proportions with respect to the polymer that are commonly used for standard vCBs. One of skill in the art will recognize that the appropriate proportion will depend upon the morphology of the carbon black, the matrix composition, and the desired use of the filled polymer. Depending on the surface area and structure, the pCB can be employed alone or in combination with a vCB, at a total carbon black loading of from about 10 phr to about 100 phr, for example, about 10 phr to about 60 phr.

The polymer composite can comprise one or more polymers, e.g., elastomers. The polymers used can be those conventionally used in the formation of, for example, elastomeric compositions, such as rubber compositions. The polymer can be used in conventional amounts.

Any suitable polymer, e.g., elastomer, can be compounded with the pCBs to provide the polymer composite. Examples of suitable elastomers include, but are not limited to, homo-or co-polymers of 1,3 butadiene, styrene, isoprene, isobutylene, 2,3-dimethyl-1,3-butadiene, acrylonitrile, ethylene, and propylene. Further examples include, but are not limited, styrene-butadiene rubber (SBR), natural rubber, halogenated rubbers, silicone, phosphazene, thionylphosphazene, fluoropolymers, polyolefins, polyesters, nylon, polyamides, polybutadiene, polyisoprene, and their oil-extended derivatives. Blends of any of the foregoing can also be used.

Among the rubbers suitable for use with the low PAH pCB described herein are natural rubber and its derivatives such as brominated rubber. The low PAH pCB can also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinyl-pyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, 1-butene and 1-pentene.

The polymer composite can be additionally compounded with one or more coupling agents to further enhance the properties of the elastomeric compound. Coupling agents, as used herein, include, but are not limited to, compounds that are capable of coupling fillers such as carbon black or silica to an elastomer. Useful coupling agents include, but are not limited to, silane coupling agents such as bis(3-triethoxysilylpropyl)tetrasulfane (Si-69), 3-thiocyanatopropyl-triethoxy silane (Si-264, from Degussa AG, Germany), γ-mercaptopropyl-trimethoxysilane (Al 89, from Union Carbide Corp., Danbury, Conn.); zirconate coupling agents, such as dineopentyl(diallyl)oxy di(3-mercapto)propionic zirconate (NZ 66A, from Kenrich Petrochemicals, Inc., of Bayonne, N.J.); titanate coupling agents; nitro coupling agents such as N,N'-bis(2-methyl-2-nitropropyl)-1,6-diaminohexane (Sumifine 1162, from Sumitomo Chemical Co., Japan); and mixtures of any of the foregoing. The coupling agents may be provided as a mixture with a suitable carrier, for example X50-S which is a mixture of Si-69 and N330 carbon black, available from Degussa AG.

Polymer composites as described herein include, but are not limited to, plastics, vulcanized rubber compounds (VR), thermoplastic vulcanizates (TPV), thermoplastic elastomers (TPE), thermoplastic urethanes and thermoplastic polyolefins (TPO). TPV, TPE, and TPO materials are further classified by their ability to be extruded and molded several times without loss of performance characteristics.

The polymer composite can further comprise an additional filler, such as, for example, a cellulose (e.g., macrocrystalline cellulose or nanocrystalline cellulose) or an inorganic filler.

The polymer composites described herein can, therefore, contain a polymer, such as an elastomer, curing agents, reinforcing filler, a coupling agent, and, optionally, various processing aids, oil extenders, accelerants, antioxidants and/or antidegradants. In addition to the examples mentioned above, the polymer can be, but is not limited to, polymers (e.g., homopolymers, copolymers, and terpolymers) manufactured from 1,3 butadiene, styrene, isoprene, isobutylene, 2,3-dimethyl-1,3-butadiene, acrylonitrile, ethylene, propylene, and the like.

Conventional techniques that are well known to those skilled in the art can be used to prepare the polymer composites and to incorporate the carbon black. The mixing of the rubber or polymer compound can be accomplished by methods known to those having skill in the rubber mixing art.

With respect to the polymer composite or rubber compounds provided by the present application, the composite contains at least one low PAH pCB and at least one polymer. Various articles of manufacture, including tires and industrial products, can contain at least one component comprised of an elastomeric composition of this invention. For example, the elastomeric composition of this invention can be used in forming a composite with reinforcing material such as in the manufacture of tires, belts or hoses. In a specific embodiment, the composite is in the form of a tire composite and more specially as a component of a tire, including, for example, one or more of the tire's tread, wirecoat, beadcoat, sidewalk, inner liner, apex, chafer and plycoat.

The pCB of the present application can further be incorporated into other rubber or polymer composites useful in articles of manufacture, including, for example, rubber mats, rubber or polymer based hoses, belts, flooring, dampeners, etc.

Consumer-Ready pCB Formulations

The present application further provides consumer-ready pCB formulations. These formulations are designed to facilitate ready use of the pCB as a filler, pigment or colourant, reinforcing material, or the like, or to impart conductivity, in a polymer composite. The consumer-ready formulations include, for example, pCB powders, colour concentrates, pellets (or "beaded black") and masterbatches.

pCB powders are readily prepared using standard techniques, following manufacture of the pCB by pyrolysis of waste rubber composite or other polymer composite, for example, according to the method described in U.S. Patent publication No. 2011/0200518. In certain embodiments, there is provided a carbon black powder that comprises a mixture of a vCB powder and a pCB powder, in any ratio.

The pCB pellets can be prepared using standard techniques of wet bind pelletization, including surfactant-assisted wet pelletization. In one alternative, the pellets are formed by mixing and pelletizing the pCB together with molasses as a binding agent. In certain embodiments, there is provided carbon black pellets that comprise a mixture of a vCB powder and a pCB powder, in any ratio, with or without a binding agent or a pelletizing additive, such as, for example, molasses, surfactant, a sugar, a polysaccharide, or a natural or synthetic wax.

A "masterbatch" is a term used to refer to a consumer-ready formulation that includes pCB incorporated in a plastic, rubber or elastomer mixture. The masterbatch can be made using conventional techniques and can contain from about 2 to about 99% pCB, or from about 2 to about 95% pCB or from about 10 to about 90% pCB. In certain embodiments, there is provided a carbon black masterbatch that comprises a mixture of a vCB powder and a pCB powder, in any ratio. As would be well appreciated by a worker skilled in the art, the carbon black masterbatch can comprise additional components that are selected based, at least in part, on the downstream application of the masterbatch. For example, in certain embodiments, the masterbatch additionally comprises a filler, or other additive.

Methods for the manufacture of carbon black masterbatch formulations are known in the field. In selecting the appropriate method and components of the masterbatch various criteria are considered including, for example, desired concentration of carbon black and good dispersion of the carbon black throughout the masterbatch and in the later produced polymer composite (e.g., rubber composite). Typically, the masterbatch is produced by extruding the carbon black, as pure pCB or a mixture of pCB and vCB, with a polymer, such as linear low density polyethylene (LLDPE). In a specific embodiment, there is provided an extruded masterbatch formulation comprising LLDPE with a pCB loading of approximately 50% by weight.

To gain a better understanding of the invention described herein, the following examples are set forth. It should be understood that these examples are for illustrative purposes only. Therefore, they should not limit the scope of this invention in any way.

EXAMPLES

Example 1

Polycyclic Aromatic Hydrocarbon (PAH) Content and Toluene Extraction Analysis

As described above, PAHs are toxic and known for their carcinogenic, mutagenic and teratogenic properties. The U.S. EPA has designated 32 PAHs as priority pollutants. Moreover, they are highly regulated by R.E.A.C.H. (Registration, Evaluation, Authorization and Restriction of Chemicals) in the EU, TSCA (Toxic Substance Control Act) in the U.S. and DSL/NDSL (Domestic Substances List/Non Domestic Substance's List) in Canada.

Two batches of pyrolytic carbon black (pCB) were prepared according to the process described and claimed in U.S. Patent Application Publication No. US2010/0249353. The two batches were then analyzed and compared to three samples of vCB (N234, N330 and N660). The results demonstrate the low level of PAHs present in the two batches of pCB.

Transmittance of Toluene Extract

The purpose of this test is to provide an estimate of the toluene-soluble discolouring residues, namely PAHs, present in the samples. Sample of the first batch of pCB and vCB were analyzed according to ASTM D1618-99 (reapproved 2004).

A second test was performed to compare the properties of the two batches of pCB, which were both prepared using the same process, one year apart ("batch 1" was prepared one year prior to "batch 2"). This study also provided an opportunity to compare the properties of batch 1 to batch 1 one year later (i.e., gauge the effect of aging).

Analysis of Toluene Extracts to Quantify PAH Amounts

Toluene extracts obtained from the tests performed above according to ASTM D1618-99were analyzed by GC-MS to determine the amount of common PAHs in the pCB batches. The total PAH content determined using this method is identified as "PAH-1" in Tables 1 and 2 below. In addition, toluene extracts obtained from a pressurized solvent extraction were also analyzed by GC-MS to determine the amount of common PAHs in the pCB batches. The total PAH content determined using this method is identified as "PAH-batch 2" in Tables 1 and 2below.

Again the test was repeated to compare the properties of the two batches of pCB prepared one year apart. The results are provided below in Table 2.

TABLE 1

PAH Content/Toluene Extract Analysis of vCB

| Test | vCB-N234 | vCB-N330 | vCB-660 |
|---|---|---|---|
| Toluene Discoloration (% T) | 86.5 | 90.0 | 48.2 |
| PAH-1 (μg/g) | 220 | 5.3 | 150 |
| PAH-2 (μg/g) | 530 | 10 | 220 |

TABLE 2

PAH Content/Toluene Extract Analysis of pCB

| Test | pCB-batch 1 | aged pCB-batch 1 | pCB-batch 2 |
|---|---|---|---|
| Toluene Discoloration (% T) | 92.9 | 94.7 | 98.2 |
| PAH-1 (μg/g) | 2.2 | 8.3 | 6.5 |
| PAH-2 (μg/g) | 2.0 | 4.2 | 4.0 |

Conclusions

The toluene discolouration test results indicated that pCB-batch 1 had a greater percent transmittance value (93%) than any of the three vCB samples; for example, a value of approximately 48% was recorded for N660. This indicates that there is less toluene-soluble material, which are predominantly PAHs, in the pCB than vCB. Further corroborating this is the analysis of the resulting extracts by GC-MS which revealed that pCB-batch 1 had significantly lower levels of PAHs, in some cases by two orders of magnitude, than the vCB samples. Pressurized solvent extraction was performed in order to generate conditions of sufficient severity to remove the majority of PAHs from the carbon black samples. All three commercially available vCBs showed considerable increases in PAH content over the results from the test (ASTM D1618-99) employing Soxhlet extraction. In contrast, the results from pCB-batch 1 effectively remained constant.

These measurements were re-recorded approximately one year later in order to determine the effect of aging on the pCB. All of the data for the aged pCB-batch 1 compared favourably with that of pCB-batch 1 taken one year earlier, indicating very little change over time. For example, the original transmittance was 93% whereas a year later it was found to be 95% while the original and later PAH content removed by pressurized toluene extraction was 4.2 ppm and 2.0 ppm, respectively. Additionally, a second batch of pCB prepared a year later than batch 1, batch 2, was evaluated in order to gauge batch-to-batch consistency. The data obtained with the aged batch and the new batch 2 were very similar, with a percent transmittance of 98% and a PAH content of 4.0 ppm.

Overall, these results indicate that the levels of PAHs are markedly lower for the pCB than for vCB samples. Moreover, aging did not have an impact on the pCB material, which also exhibited batch-to-batch consistency.

Example 2

Transmission Electron Microscopy and Particle Size Analysis

Figure 1B:
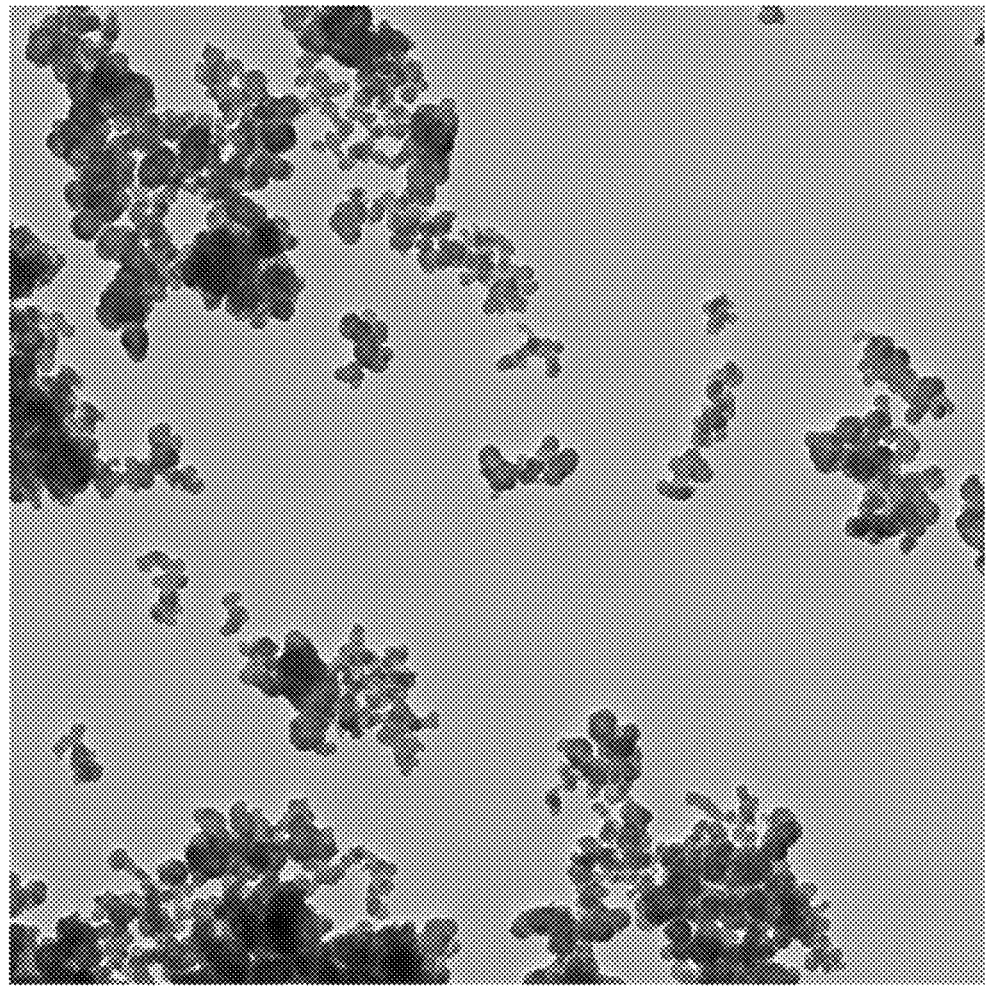
Figure 2A:
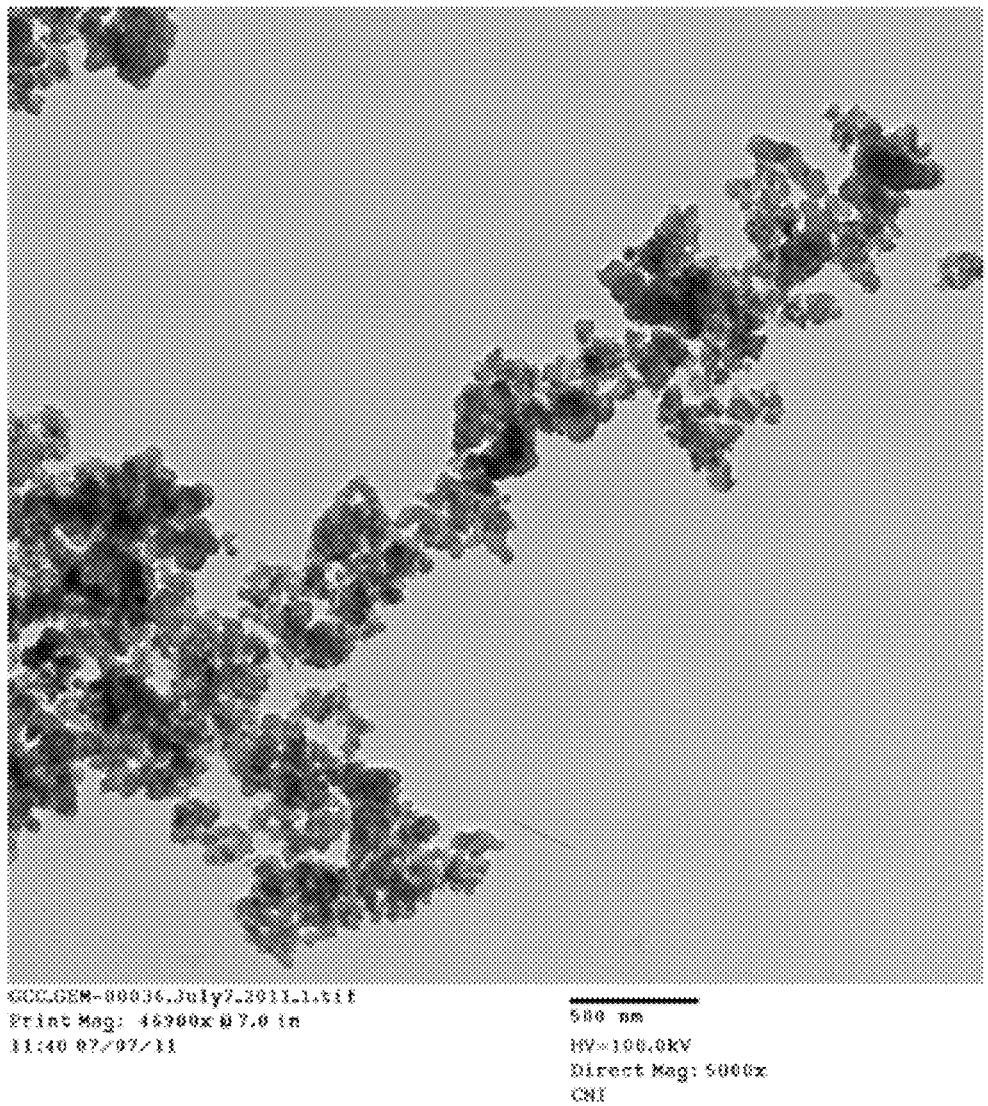
FIGS. 2A and 2B are TEM images of aged pCB-batch 1 at a direct magnification of 5000×, where the scale bar shown in FIG. 2A is 500 nm and the scale bar shown in FIG. 2B is 100 nm.
Figure 2B:
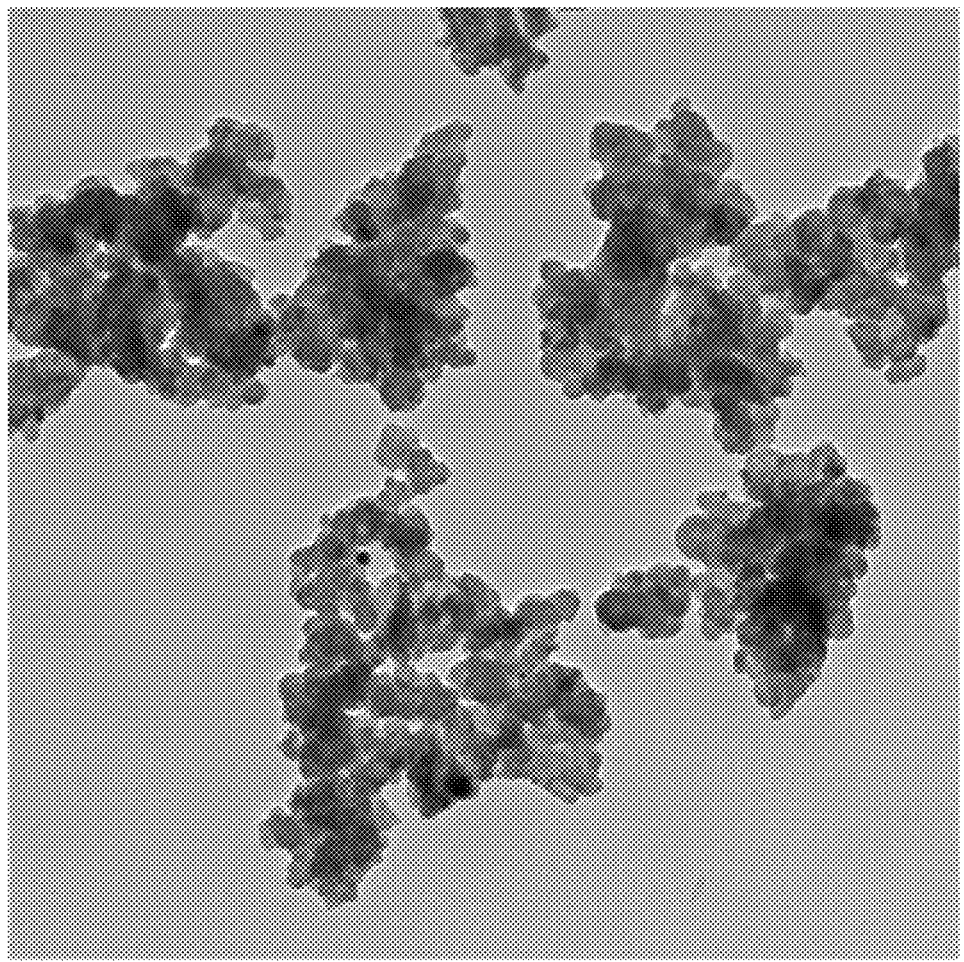
Figure 3A:
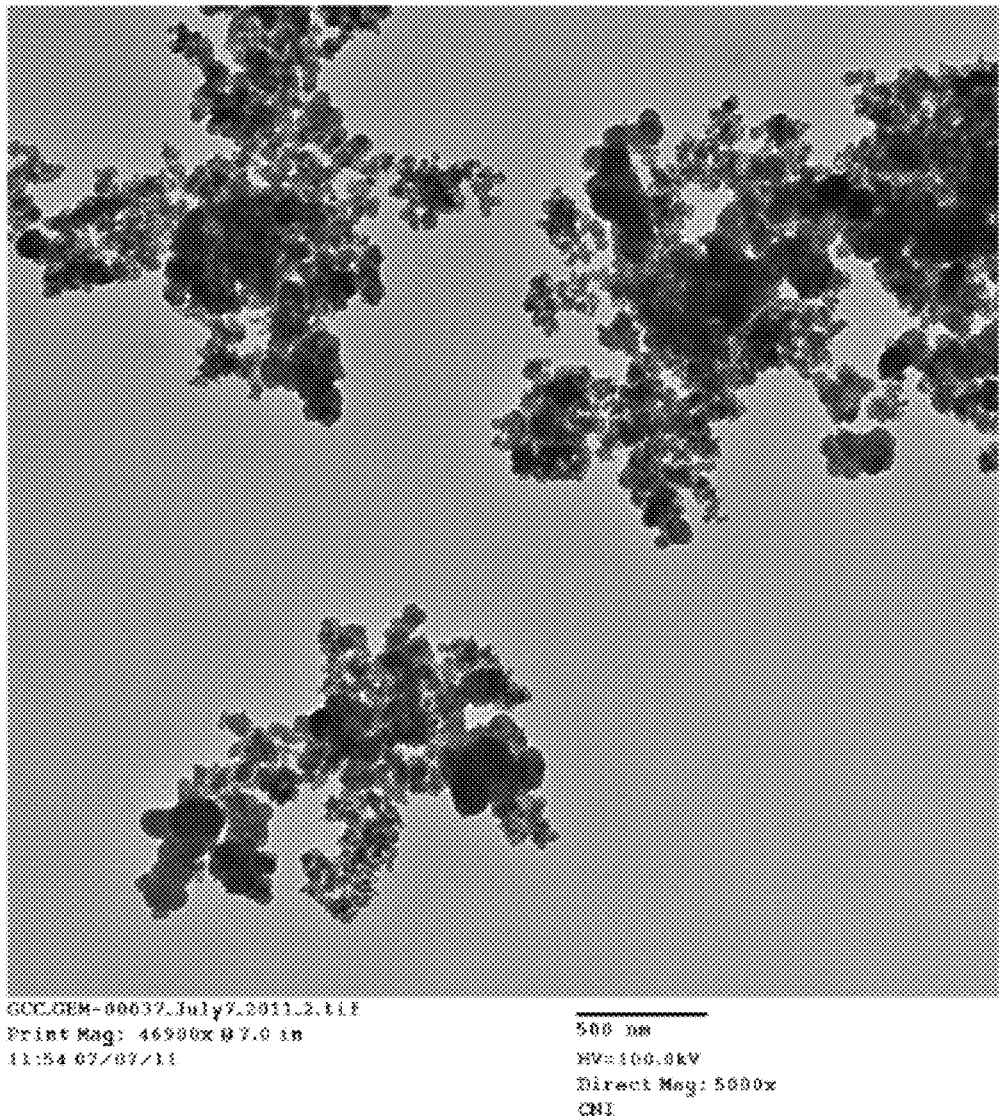
FIGS. 3A and 3B are TEM images of pCB-batch 2 at a direct magnification of 5000×, where the scale bar shown in FIG. 3A is 500 nm and the scale bar shown in FIG. 3B is 100nm.
Figure 3B:
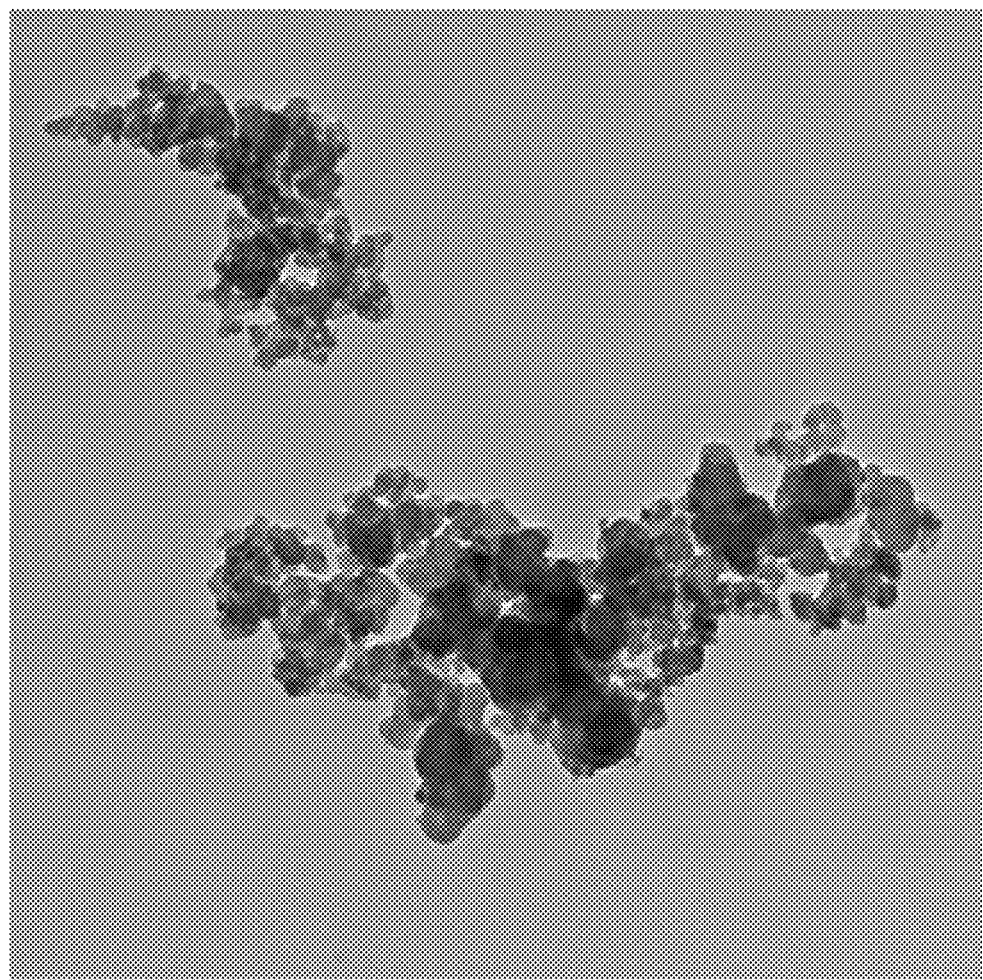

Transmission electron microscopy (TEM) studies were performed with N660 vCB, aged pCB-batch 1 and pCB-batch 2, all of which were first dispersed in hexane followed by brief sonication. The TEM images of all three samples revealed the presence of aggregated material; see FIGS. 1, 2 and 3. However, this secondary structure clearly consisted of primary particles in all cases with roughly spherical morphology, most prominently with vCB. Particle size analysis was also conducted hut was challenging due to the tendency of the particles to agglomerate. Average values of 83 nm, 56 nm and 77 nm were measured for vCB, aged pCB-batch 1 and pCB-batch 2, respectively, which indicated that the particle sizes of the pCB samples are comparable to one another as well as to commercial N660 vCB.

TABLE 3

Particle Sizes Analysis[1]

| | vCB-N660 | aged pCB-batch 1 | pCB-batch 2 |
|---|---|---|---|
| Particle Size (nm) | 83.477 ± 33.242 | 55.832 ± 12.912 | 77.003 ± 35.563 |

Note:
[1]Each measurement was the mean of 3 samples.

Example 3

Characterization of pCB

The aged pCB-batch 1 described above in Example 1, and N660 vCB were further analyzed by X-ray Photoelectron Spectroscopy (XPS) to determine the elemental composition of the sample surface of the pCB batch in comparison to the virgin carbon black. In addition, the aged pCB-batch 1 and pCB-batch 2 were analyzed to determine ash content; total sulfur content; and moisture content.

The XPS analyses were performed on samples of the carbon black, using the Kratos Axis Ultra XPS equipped with a monobromated Al X-ray source. One analysis was performed on each sample. Analyses were carried out using an accelerating voltage of 14 kV, a current of 10 mA and aperture size of 300×700 µm. Charge build-up was compensated for using the Axis charge balancing system. The pressure in the analysis chamber during analysis was $2.0 \times 10^{-9}$ torr.

XPS Analysis

During each analysis, a survey scan was first performed at a pass energy of 160 eV to identify all the species present, followed by high resolution scans (20 eV) of the species identified by the survey scan. Peak assignments were based on the NIST database (http://srdata.nist.gov/xps/Bind_E.asp) and selected publications. Peak fitting was performed using CasaXPS (vex. 2.2.16dev92) data processing software. Shirley background correction procedures were used as provided by CasaXPS. Curve fitting procedures used for high resolution spectra used a Gaussian-Lorentzian (30) function. High resolution analyses were calibrated to adventitious C 1s signal, at 285 eV. Quantification was performed using sensitivity factors provided by CasaXPS's Scofield element library.

XPS analysis of N660 vCB and the aged pCB-batch 1 revealed subtle differences in surface elemental composition; however, as expected, a bulk of both samples was found to consist of graphitic and aliphatic carbon with trace amounts of oxygen and sulfur. In both samples, the binding energies suggested that the sulfur is bound to carbon while in the aged pCB-batch 1, sulfide bonds to zinc were also observed. The aged pCB-batch 1 was distinguished from vCB by the increase in oxygen content (likely due to residual oxides) as well as minor to trace quantities of zinc, silicon and fluoride.

Figure 4:
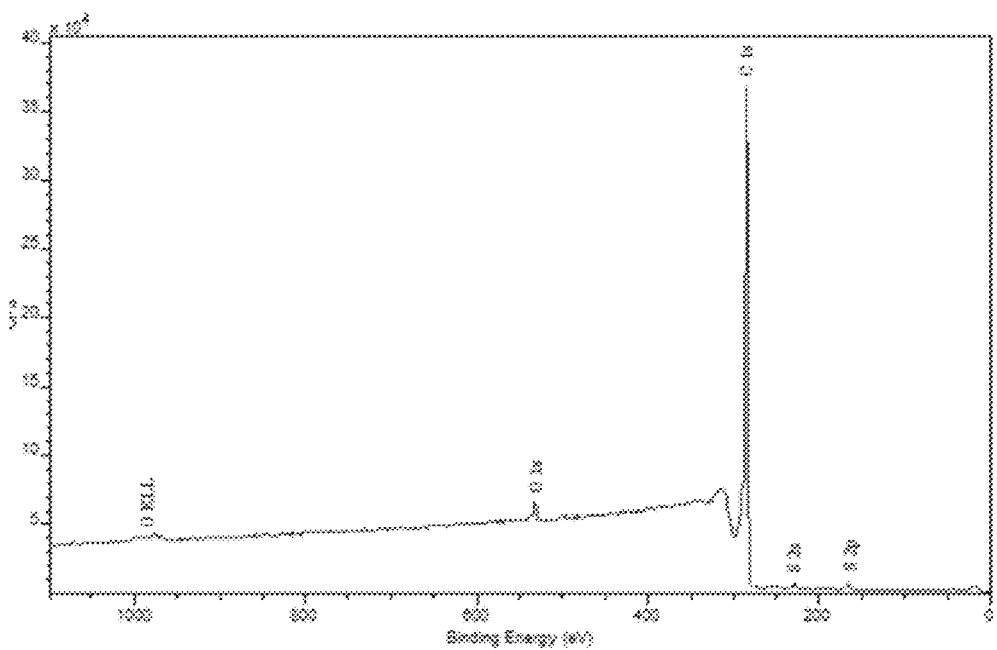
FIG. 4 depicts an X-ray Photoelectron Spectroscopy (XPS) scan obtained using vCB-N660.
Figure 5:
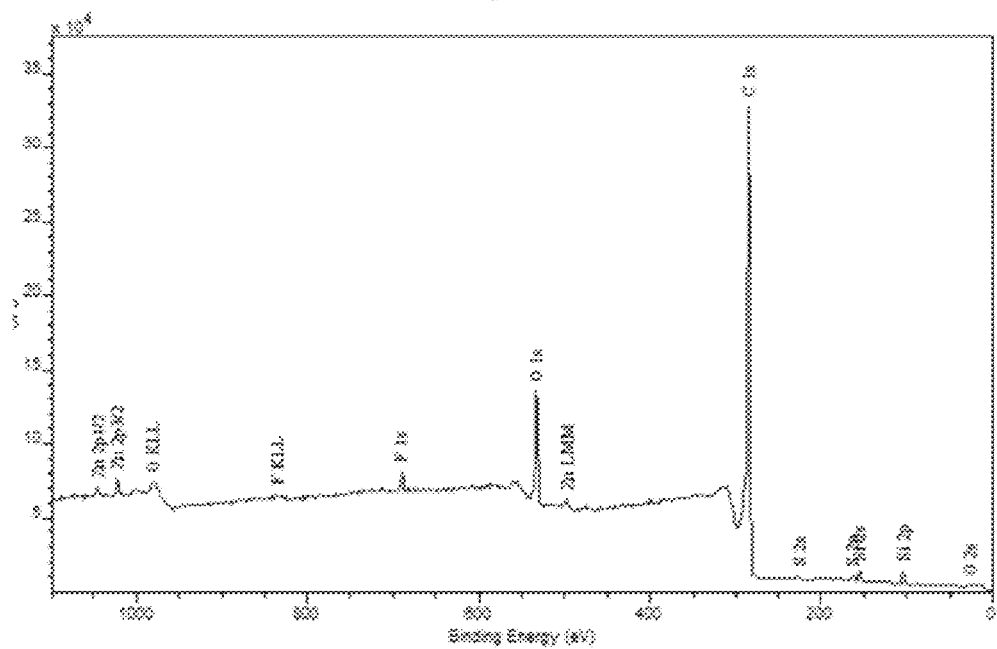
FIG. 5 depicts an XPS scan obtained using the aged pCB-batch 1.

FIG. 4 depicts an XPS scan obtained using vCB-N660. FIG. 5 depicts an XPS scan obtained using the aged pCB-batch 1.

Ash, Sulfur and Moisture Content

To determine ash content, a sample of each carbon black tested was ashed for 2 hours at 560° C according to ASTM D4574. To determine sulfur content, a sample of each carbon black tested was combusted in an oxygen atmosphere where the sulfur oxidized to $SO_2$ gas. The $SO_2$ gas generated was then measured using an infrared cell and the results used to calculate the sulfur content. To determine moisture content, a sample of each carbon black was massed before and after being dried at 125° C. Gravimetric analysis (e.g., mass before heating to 1.255° C.–mass after=water loss converted to a percentage) was performed to obtain percentage values for moisture content.

Sulfur, ash and water content measurements were performed, as described, using the aged pCB-batch 1 and pCB-batch 2. Batch-to-batch consistency was again observed with desirable lower values recorded in all cases for the more recent pCB-batch 2. The moisture and sulfur contents (~1% and 2%, respectively) were comparable to virgin material. The ash content values of 19.5% and 16.3% were recorded for aged pCB-batch 1 and pCB-batch 2, respectively.

TABLE 4

Content Analysis of pCB

| Content Test | aged pCB-batch 1 | pCB-batch 2 |
| --- | --- | --- |
| Total Sulfur (%) | 2.493 | 1.643 |
| Ash Content (%) | 19.5 | 16.3 |
| Moisture Content (%) | 1.2709 | 1.1030 |

Example 4

Passenger Vehicle Tire Rubber Compounds Prepared with pCB

This example provides details of a study performed by formulating and testing the material properties of four tire rubber compounds comprising either vCB, pCB or a mixture thereof. The four tire rubber compounds were carbon black filled tread, silica filled high traction tread, sidewall and inner liner.

The test compounds were generated in a Brabender mixer having a 430 cc mixing bowl and cam type blades. The cure system for each of the 8 compounds was mixed into the rubber using a 2-roll rubber mill. All formulation values are parts per hundred of rubber (phr).

A. 100% Replacement of pCB in Tire Rubber Compounds Inner Liner Compound Analysis

TABLE 5

Inner Liner Compound Formulation

| | |
| --- | --- |
| Brominated isoprene isobutylene rubber (BIIR) | 100 |
| Carbon Black | 60 |
| Paraffinic Oil | 7 |
| Tackifying Resin | 4 |
| Stearic Acid | 1 |
| di(benzothiazol-2-yl) disulfide (MBTS) | 1.3 |
| Sulfur | 0.5 |
| Zinc Oxide | 3 |
| Total | 176.8 |

TABLE 6

Inner Liner Compound Evaluation (Confidence Intervals Expressed at 95%)

| | | vCB-N660 | pCB-batch 1 | aged pCB-batch 1 | pCB-batch 2 |
| --- | --- | --- | --- | --- | --- |
| Rheometry | ts2 (min) | 4.2 | 6.1 | 7.5 | 7.3 |
| (160° C.) | t90 (min) | 8.0 | 12.7 | 14.8 | 18.7 |

TABLE 6-continued

Inner Liner Compound Evaluation (Confidence Intervals Expressed at 95%)

|  |  | vCB-N660 | pCB-batch 1 | aged pCB-batch 1 | pCB-batch 2 |
|---|---|---|---|---|---|
| Tensile (psi) | Stress at 100% | 169 ± 3.0 | 169 ± 6.0 | 152 ± 0.7 | 182 ± 0.6 |
|  | Stress at 300% | 530 ± 13 | 496 ± 15 | 430 ± 2.0 | 576 ± 1.5 |
|  | Stress at Break | 1258 ± 123 | 642 ± 29 | 714 ± 1.5 | 1136 ± 1.3 |
|  | Elongation at Break (%) | 678 ± 67 | 473 ± 53 | 640 ± 1.1 | 614 ± 1.6 |
| Hardness (3 sec) |  | 56.9 ± 0.56 | 49.3 ± 0.25 | 50 ± 0 | 53.4 ± 0.24 |
| Gas Permeability ($cm^2$/sec-atm) | Air[1] | 2.33e−8 | 7.66e−9 | 1.82e−8 | 1.15e−8 |
|  | Nitrogen[2] | 1.33e−9 | 1.19e−9 | 5.92e−9 | 8.51e−9 |

[1]Air pressure: 30 psi for pCB-1; 15 psi for all other samples.
[2]Nitrogen pressure: 60 psi for pCB-1 and vCB-N660; 15 psi for pCB-1* and pCB-2.

Direct comparisons can be made between gas permeability values as different pressures were accounted for in the final calculation.

CB Filled High Traction Tread Compound Analysis

TABLE 7

CB Filled High Tread Compound Formulation

| styrene-butadiene rubber (SBR) | 70 |
|---|---|
| butyl rubber (BR) | 30 |
| Carbon Black | 80 |
| Paraffinic Oil | 10 |
| Stearic Acid | 1 |
| N-(1,3-dimethylbutyl)-N'-phenyl-p-phenylenediamine (6PPD) | 1 |
| 2,2,4-trimethyl-1,2-dihydroquinoline, (TMQ) | 1 |
| Zinc Oxide | 2.5 |
| Sulfur | 1.4 |
| N-cyclohexyl-2-benzothiazole sulfenamide (CBS) | 1.7 |
| Total | 198.6 |

TABLE 8

CB Filled High Traction Tread Compound Evaluation (Confidence Intervals Expressed at 95%)

|  |  | vCB-N234 | pCB-batch 1 | aged pCB-batch 1 | pCB-batch 2 |
|---|---|---|---|---|---|
| Rheometry (160° C.) | ts2 (min) | 1.7 | 3.6 | 4.9 | 3.5 |
|  | t90 (min) | 4.5 | 6.7 | 8.9 | 6.7 |
| Tensile (psi) | Stress at 100% | 623 ± 4.6 | 505 ± 12 | 498 ± 1.1 | 548 ± 1.4 |
|  | Stress at 300% | 2586 ± 35 | 1070 ± 7.5 | 1074 ± 0.3 | 1346 ± 0.9 |
|  | Stress at Break | 2707 ± 139 | 1156 ± 27 | 1156 ± 2.0 | 1548 ± 2.9 |
|  | Elongation at Break (%) | 315 ± 17 | 378 ± 29 | 372 ± 3.2 | 366 ± 1.9 |
| Hardness (3 sec) |  | 76.7 ± 0.21 | 64.7 ± 0.16 | 66.6 ± 0.13 | 66.6 ± 0.13 |
| Dynamic Heat Build-up (° C.) |  | 43 | 13 | 21 | 23 |
| Abrasion (volume loss, $cm^3$) |  | 0.252 | 0.412 | 0.210 | 0.176 |

Silica Filled High Traction Tread Compound Analysis

TABLE 9

Silica Filled High Tread Compound Formulation

| SBR | 70 |
|---|---|
| BR | 30 |
| Silica | 70 |
| Silane | 6.4 |
| Carbon Black | 10 |
| Paraffinic Oil | 10 |
| Stearic Acid | 1 |
| 6PPD | 1 |
| TMQ | 1 |
| Zinc Oxide | 2.5 |
| Sulfur | 1.4 |
| CBS | 1.7 |
| 1,3-diphenylguanidine (DPG) | 2 |
| Total | 207 |

TABLE 10

Silica Filled High Traction Tread Compound Evaluation
(Confidence Intervals Expressed at 95%)

|  |  | vCB-N234 | pCB-batch 1 | aged pCB-batch 1 | pCB-batch 2 |
|---|---|---|---|---|---|
| Rheometry (160° C.) | ts2 (min) | 0.60 | 3.7 | 2.1 | 1.7 |
|  | t90 (min) | 14.1 | 14.8 | 9.9 | 10.2 |
| Tensile (psi) | Stress at 100% | 675 ± 19 | 769 ± 18 | 822 ± 0.9 | 882 ± 3.3 |
|  | Stress at 300% | Break | Break | Break | Break |
|  | Stress at Break | 2144 ± 200 | 1601 ± 72 | 2044 ± 10 | 2192 ± 7.6 |
|  | Elongation at Break (%) | 245 ± 21 | 190 ± 8.1 | 220 ± 2.6 | 216 ± 2.4 |
| Hardness (3 sec) |  | 79.9 ± 0.35 | 78.1 ± 0.96 | 78.2 ± 0.19 | 79 ± 0.16 |
| Dynamic Heat Build-up (° C.) |  | 27 | 25 | 23 | 23 |
| Abrasion (volume loss, $cm^3$) |  | 0.260 | 0.268 | 0.142 | 0.145 |

Sidewall Compound Analysis

TABLE 11

Sidewall Compound Formulation

| Natural rubber (NR) | 50 |
|---|---|
| BR | 50 |
| Zinc Oxide | 4 |
| Stearic Acid | 2 |
| Sulfur | 0.5 |
| TMQ | 1 |
| CBS | 0.75 |
| Carbon Black | 50 |
| Naphthenic Oil | 10 |
| Total | 168.25 |

TABLE 12

Sidewall Compound Evaluation (Confidence Intervals Expressed at 95%)

|  |  | vCB-N330 | pCB- batch 1 | aged pCB-batch 1 | pCB-batch 2 |
|---|---|---|---|---|---|
| Rheometry (160° C.) | ts2 (min) | 4.1 | 6.4 | 8.5 | 7.2 |
|  | t90 (min) | 8.8 | 12.1 | 14.9 | 13.1 |
| Tensile (psi) | Stress at 100% | 140 ± 2.6 | 124 ± 1.0 | 122 ± 0.8 | 124 ± 1.0 |
|  | Stress at 300% | 502 ± 6.7 | 464 ± 6.8 | 422 ± 0.8 | 440 ± 0.9 |
|  | Stress at Break | 1733 ± 118 | 975 ± 44 | 942 ± 2.5 | 1002 ± 3.6 |
|  | Elongation at Break (%) | 648 ± 27 | 525 ± 17 | 552 ± 1.2 | 556 ± 2.7 |
| Hardness (3 sec) |  | 47.5 ± 0.47 | 42.5 ± 0.31 | 42.8 ± 0.14 | 43 ± 0 |
| Dynamic Heat Build-up (° C.) |  | 85 | 70 | 75 | 80 |

10% Replacement of pCB-2 in Tire Rubber Compounds Analysis

Inner Liner Compound Analysis

TABLE 13

Inner Liner Compound Formulation (with 10% Replacement)

|  | Control | 10% Replacement |
|---|---|---|
| BIIR | 100 | 100 |
| vCB-N660 | 60 | 54 |
| pCB-batch 2 | 0 | 6 |
| Paraffinic Oil | 7 | 7 |
| Tackifying Resin | 4 | 4 |
| Stearic Acid | 1 | 1 |
| MBTS | 1.3 | 1.3 |
| Sulfur | 0.5 | 0.5 |
| Zinc Oxide | 3 | 3 |
| Total | 176.8 | 176.8 |

TABLE 14

10% Replacement Inner Liner Compound Evaluation
(Confidence Intervals Expressed at 95%)

|  |  | Control | 10% replacement |
|---|---|---|---|
| Rheometry (160° C.) | minimum torque (ML) (dNm) | 1.6 | 1.75 |
|  | maximum torque (MH) (dNm) | 5.29 | 5.3 |
|  | ts2 (min) | 4.76 | 5.42 |
|  | t90 (min) | 10.38 | 11.04 |
| Tensile (psi) | Stress at 10% | 62 ± 0.3 | 62 ± 0.5 |
|  | Stress at 100% | 141 ± 0.6 | 145 ± 0.5 |
|  | Stress at 300% | 467 ± 1.8 | 465 ± 0.9 |
|  | Stress at Break | 1380 ± 1.1 | 1305 ± 2.5 |
|  | Elongation at Break (%) | 797 ± 1.2 | 773 ± 2.1 |
| Hardness (3 sec) |  | 52.3 ± 0.1 | 50.7 ± 0.1 |

CB Filled High Traction Tread Compound Analysis

TABLE 15

CB Filled High Traction Tread Compound Formulation (with 10% Replacement)

|  | Control | 10% Replacement |
|---|---|---|
| SBR | 70 | 70 |
| BR | 30 | 30 |
| vCB-N234 | 80 | 72 |
| pCB-batch 2 | 0 | 8 |
| Paraffinic Oil | 10 | 10 |
| Stearic Acid | 1 | 1 |
| 6PPD | 1 | 1 |
| TMQ | 1 | 1 |
| Zinc Oxide | 2.5 | 2.5 |
| Sulfur | 1.4 | 1.4 |
| CBS | 1.7 | 1.7 |

TABLE 16

10% Replacement CB Filled High Traction Tread Compound Evaluation (Confidence Intervals Expressed at 95%)

|  |  | Control | 10% replacement |
|---|---|---|---|
| Rheometry (160° C.) | ML (dNm) | 5.36 | 5.15 |
|  | MH (dNm) | 26.51 | 23.07 |
|  | ts2 (min) | 1.88 | 2.32 |
|  | t90 (min) | 4.63 | 5.38 |
| Tensile (psi) | Stress at 10% | 169 ± 0.9 | 143 ± 0.4 |
|  | Stress at 100% | 651 ± 1.0 | 556 ± 0.6 |
|  | Stress at 300% | Break | 2314 ± 1.7[1] |
|  | Stress at Break | 2396 ± 8.2 | 2146 ± 10 |
|  | Elongation at Break (%) | 262 ± 2.4 | 280 ± 3.5 |
|  | Hardness (3 sec) | 78.4 ± 0.1 | 74.8 ± 0.1 |

[1] This tensile strength value was determined from 2 samples as the other three samples broke before 300% elongation.

Silica Filled High Traction Tread Compound Analysis

TABLE 17

Silica Filled High Traction Tread Compound Formulation (with 10% Replacement)

|  | Control | 10% Replacement |
|---|---|---|
| SBR | 75 | 75 |
| BR | 25 | 25 |
| Silica | 60 | 60 |
| Silane | 4.8 | 4.8 |
| vCB-N234 | 10 | 9 |
| pCB-batch 2 | 0 | 1 |
| Processing Oil | 33.12 | 33.12 |
| Zinc Oxide | 1.9 | 1.9 |
| Microcrystalline wax | 2 | 2 |
| 6PPD | 2 | 2 |
| Wingstay 100 | 0.5 | 0.5 |
| Stearic Acid | 1.5 | 1.5 |
| Process Aid (KK49) | 2 | 2 |
| Sulfur | 1.5 | 1.5 |
| CBS | 1.3 | 1.3 |
| DPG | 1.5 | 1.5 |
| Total | 222.12 | 222.12 |

TABLE 18

10% pCB Replacement Silica Filled High Traction Tread Compound Evaluation (Confidence Intervals Expressed at 95%)

|  |  | Control | 10% Replacement |
|---|---|---|---|
| Rheometry (160° C.) | ML (dNm) | 0.64 | 0.86 |
|  | MH (dNm) | 10.48 | 12.61 |
|  | ts2 (min) | 3.98 | 3.93 |
|  | t90 (min) | 11.14 | 11.92 |
| Tensile (psi) | Stress at 100% | 216 ± 0.5 | 222 ± 1.6 |
|  | Stress at 300% | 1119 ± 1.3 | 1016 ± 4.9 |
|  | Stress at Break | 2358 ± 4.6 | 2244 ± 6.2 |
|  | Elongation at Break (%) | 526 ± 2.4 | 543 ± 2.1 |
|  | Hardness (3 sec) | 52.5 | 56.3 |

Sidewall Compound Analysis

TABLE 19

Sidewall Compound Formulation (with 10% Replacement)

|  | Control | 10% Replacement |
|---|---|---|
| NR | 50 | 50 |
| BR | 50 | 50 |
| Zinc Oxide | 4 | 4 |
| Stearic Acid | 2 | 2 |
| Sulfur | 1.25 | 1.25 |
| TMQ | 1 | 1 |
| CBS | 0.75 | 0.75 |
| vCB-N330 | 50 | 45 |
| pCB-batch 2 | 0 | 5 |
| Napthenic Oil | 10 | 10 |
| Total | 169 | 169 |

TABLE 20

10% Replacement Sidewall Compound Evaluation (Confidence Intervals Expressed at 95%)

|  |  | Control | 10% Replacement |
|---|---|---|---|
| Rheometry (160° C.) | ML (dNm) | 2.01 | 2.01 |
|  | MH (dNm) | 12.97 | 12.57 |
|  | ts2 (min) | 3.62 | 3.92 |
|  | t90 (min) | 7.60 | 7.92 |
| Tensile (psi) | Stress at 10% | 70 ± 0.6 | 65 ± 0.6 |
|  | Stress at 100% | 254 ± 1.0 | 232 ± 0.4 |
|  | Stress at 300% | 1081 ± 2.4 | 1001 ± 2.0 |
|  | Stress at Break | 3372 ± 1.0 | 3164 ± 1.8 |
|  | Elongation at Break (%) | 663 ± 0.7 | 664 ± 1.6 |
|  | Hardness (3 sec) | 56.0 | 55.9 |

Evaluation of Materials Prepared with pCB-batch 1 and Aged pCB-batch 1—Aging Study Four tire compounds were prepared using pCB-batch 1 as the only carbon black in the formulations, as set out above in Tables 5, 7, 9 and 11. This was benchmarked to control compounds employing vCB in place of the pCB. The results are provided in Tables 6, 8, 1.0 and 12 above.

In the case of compounds comprising more reinforcing blacks such as N234 (CB filled tread) or N330 (sidewalk), a drop in material properties was observed as the vCB was replaced with pCB-batch 1. Although the silica filled tread also utilizes highly reinforcing N234 vCB, it is a minor component of the formulation whereas silica is providing a majority of the reinforcement. Thus, it was found that the material properties were generally consistent even upon complete replacement with pCB-batch 1. In the case of compounds comprising less reinforcing blacks such as N660, namely the inner liner, the overall material properties did not degrade significantly, even when pCB-batch 1 was the sole filler used.

A similar study was performed using aged pCB-batch 1 and compared to the data obtained with pCB-batch 1 as a means of determining the effects of carbon black aging on compound properties. The results are provided in Tables 6, 8, 10 and 12 above.

For the inner liner, slightly increased ts2 scorch times (herein ts2) and t90 total cure times (herein t90) were observed upon aging. For example, ts2 values of 6.1 and 7.5 minutes were observed for pCB-batch 1 and aged pCB-batch 1, respectively. However, other metrics including tensile strength, hardness and gas permeability yielded very little differences between the materials produced with different pCB samples indicating essentially no effect from the aging whatsoever. For example, the stress at break values of 642 and 714 psi for pCB-batch 1 and aged pCB-batch 1, respectively, do not represent any drop in material properties with time. This is further corroborated by the measured hardness values of 49 and 50.

These observations were underscored in the case of the sidewall and carbon black filled tread compounds. In the case of the latter, while ts2 and t90 times were increased by 1-2 minutes as a result of incorporation of aged pCB-batch 1, the tensile measurements were effectively identical across the board. For example, elongation at break values of 378% and 372% were noted for treads comprising pCB-batch 1 and aged pCB-batch 1, respectively. Indeed, the dynamic heat build-up and abrasion resistance experiments revealed an apparent increase in performance with age, as higher and lower values were determined, respectively. Moreover, all data measured for the silica filled tread was either equal or superior with incorporation of the aged pCB-batch 1.

Overall, these results strongly indicate little to no change in material properties is observed with aging of the pCB employed in a given tire compound's formulation. These results further indicated that the tire compounds tested can be successfully prepared using pCB. Although some of the properties of the compounds tested were slightly inferior using the pCB in comparison to vCB, the results nevertheless demonstrated that the compounds can be prepared with either a full or a partial replacement of the vCB with the pCB.

Evaluation of Materials Prepared with Aged pCB-Batch 1 and pCB-Batch 2-Batch to Batch Consistency Study The four tire compounds described in Tables 5, 7, 9 and 11 were also generated using pCB-batch 2 in the formulation. This was benchmarked to the data obtained with aged pCB-batch 1 in a side-by-side manner in order to gauge batch-to-batch consistency.

As shown above, for the inner liner, the rheometry data was very comparable with a higher t90 value in that which was prepared with pCB-batch 2, while the hardness and gas permeability metrics revealed nearly identical properties. Interestingly, the tensile strength was higher with pCB-batch 2 than the aged pCB-batch 1 material with a stress at break of 1136 psi compared to 714 psi, although at a slightly lower elongation of 614% relative to 640%.

For both the tread compounds, comparable if not superior results were obtained with pCB-batch 2. For example, with the silica filled tread the ts2 and t90 times of 2.1/1.7 minutes and 9.9/10.2 minutes for aged pCB-batch 1 and pCB-batch 2, respectively, are effectively the same while dynamic heat build-up temperatures of 23° C. were recorded with both samples. The stress values at break of 2192 and 2044 psi showed that the tread with pCB-batch 2 was a somewhat stronger material. Lastly, the sidewall compound also exhibits essentially identical data across the board, with marginal improvements in materials comprising pCB-batch 2.

Overall, these results strongly indicate little to no change in properties is observed with different batches of pCB employed in a given tire compound's formulation confirming batch-to-batch consistency.

Evaluation of Materials Prepared with vCB and 10% Replacement with pCB-2

Four tire compounds were prepared with vCB and pCB-batch 2 in a ratio of 90:10, as described in Tables 13, 15, 17 and 19. These compound material properties were then benchmarked to those containing vCB only, which were generated in a side-by-side manner. The results are provided in Tables 14, 16, 18 and 20, above.

For the inner liner, the rheometric data showed that a slight increase (less than 1minute in both cases) in ts2 and t90 times resulted from incorporating pCB-batch 2 into the formulation at the expense of vCB. The tensile metrics were highly comparable with stress and elongation at break values of 1380,1305 psi and 797/773% observed for vCB and pCB-batch 2, respectively, while similar hardness measurements of 52 and 51 were also recorded.

In the case of the carbon black filled tread, a similar minimal increase in ts2 and t90 times was also observed. Tensile metrics were significantly different from one another with the vCB only material giving a stress at 100% elongation of 651 psi while that of 10% pCB-2was 556 psi. Furthermore, the stress at 300% measurement could not be conducted with the vCB material as the sample broke in all five cases, whereas two samples did not yield with 10% pCB-batch 2. This indicates a greater degree of elasticity with pCB-batch 2 incorporation, perhaps due to the less reinforcing qualities of this carbon black relative to N234 vCB.

Ten percent replacement of the same vCB in the silica tread formulation with pCB-batch 2 did not have any negative effect on the compound material properties. For example, the ts2 and t90 times were very comparable as they were within one minute of each other in both cases. Near identical elongations at break of 526 and 543% were recorded for materials with vCB only and 10% pCB-batch 2, respectively, whereas a minor decrease in the maximum tensile stress values at 2358 and 2244 psi were measured. Despite this, the observed hardness was greater for the material comprising pCB-batch 2 at 56.3 compared to that of the vCB material at 52.5.

The replacement of 10% N330 vCB in the sidewall formulation was found to have a very negligible effect on the resultant material. With regards to the rheometric measurements, the ts2 and t90 times were 3.62/3.92 and 7.60/7.92 minutes, respectively, for the vCB and 10% pCB-batch 2 compounds. The tensile values were also very similar as the tensile strength and elongation at break values of 3372/31.64 psi and 663/664% respectively, indicate, while the hardness of 56.0 versus 55.9 can be considered identical.

Overall, these results strongly indicate little to no change in material properties is observed upon replacing 10% of the appropriate vCB with pCB-batch 2 in the inner liner, sidewall and silica tread formulations used in this study. This supports the use of the present pCB in these compounds.

Example 5

Large Truck Tire Rubber Compounds Prepared with vCB and 10% Replacement with pCB A study was initiated in which proprietary off the road retreading compounds typically used for large trucks, earth movers and loaders in the mining industry were prepared with N231 vCB and either aged pCB-batch 1 or pCB-batch 2 in a ratio of 90:10 (vCB:pCB). The compound material properties were then benchmarked to those containing N231 vCB only, which were generated in aside-by-side manner. The results are shown in Table 21, below:

TABLE 21

Off the Road Retreading Tire Compound Evaluation (with 10% pCB Replacement)

| | | vCB-N231 | 10% aged pCB-batch 1 | 10% pCB-batch 2 |
|---|---|---|---|---|
| Mooney Viscosity (212° F.) | MI | 53.70 | 50.00 | 38.30 |
| | ML | 44.60 | 38.30 | 38.40 |
| Mooney Scorch (280° F.) | ML | 34.10 | 27.80 | 28.00 |
| | t5 | 13.1 | 14.12 | 14.51 |
| | t35 | 18.43 | 19.91 | 20.23 |
| Rheometry (375° F./1.5 min) | ML | 1.33 | 1.18 | 1.23 |
| | ts2 | 0.48 | 0.50 | 0.51 |
| | t50 | 0.69 | 0.71 | 0.71 |
| | t90 | 0.99 | 0.99 | 0.97 |
| | MH | 12.00 | 12.35 | 11.81 |
| Rheometry (280° F./80 min) | ML | 1.68 | 1.53 | 1.55 |
| | ts2 | 17.31 | 16.36 | 16.48 |
| | t50 | 21.32 | 20.42 | 20.75 |
| | t80 | 26.64 | 25.86 | 26.42 |
| | t90 | 30.49 | 29.83 | 30.56 |
| | MH | 16.03 | 16.59 | 16.92 |
| Tensile (psi) (280° F./25 min) | Tensile | 3140 | 3080 | 3017 |
| | Elongation (%) | 543 | 531 | 525 |
| | 300% Modulus | 1283 | 1333 | 1280 |
| Die C Tear (lb/in) | | 581 | 565 | 508 |
| Durometer | | 69.0 | 70.0 | 71.0 |
| Density | | 1.13 | 1.12 | 1.13 |
| Flexometer (300° F.) | Hysteresis (° F.) | 41 | 36 | 33 |
| | Blowout Minutes | 3.9 | 7.0 | 7.1 |
| Cut & Chip (300° F.) | Mass Loss (%) | 16.2 | 16.0 | 15.5 |
| | Dia. Loss (%) | 20.0 | 20.0 | 19.8 |
| DIN Abrasion Loss (mm³) | | 183.7 | 176.3 | 177.9 |
| Dispersion | | x = 3.91 | x = 2.77 | x = 1.86 |
| | | y = 8.76 | y = 7.14 | y = 6.13 |

The Mooney scorch times t5 and t35 showed slight increases for materials containing vCB only in comparison to those with either of the pCB samples incorporated; however, the t90 values were essentially identical across the board (e.g. 0.97-0.99 minutes at 190° C.). Similarly, the tensile strength of both pCB samples were similar to one another as well as to that of vCB-containing compound. For example, the moduli at 300% elongation are 1283, 1333 and 1280 psi for vCB, aged pCB-batch 1 and pCB-batch 2, respectively. Moreover, the elongation at break values are 543, 531 and 525%, respectively. The similarity between the three samples was underscored by their DIN abrasion volume losses which were 184, 176 and 178 mm³.

Overall, these results demonstrate little to no change in material properties is observed upon replacing 10% of the highly reinforcing N231 vCB with either pCB-batch 1 or pCB-batch 2 in this demanding large track tire formulation. The comparable properties also emphasize the consistency between different batches of the present pCB.

Example 6

Technical (Non-Tire 1 Rubber Products Prepared with pCB

Various technical rubber products, having a broad range of industrial applications, were formulated with vCB, pCB or a mixture thereof. The material properties of these technical rubber products were evaluated as described below.

Evaluation of Underbody Component Materials Prepared with vCB, and 10% or 100% Replacement with pCB-2

Ethylene propylene diene monomer (EPDM) compounds, useful as automobile underbody compounds, such as deflector and splash shields, were generated and tested using vCB and with either 10% or complete replacement using pCB-batch 2 (see, Table 22). The vCB was N550—a medium reinforcing carbon black. All chemicals listed below were weighed and mixed in a 430 cc Brabender head with cam blades at 50° C.

TABLE 22

EPDM Compound Formulations

| | Control | 10% pCB-batch 2 Replacement | 100% pCB-batch 2 Replacement |
|---|---|---|---|
| EPDM (Vistalon™ 7001) | 100 | 100 | 100 |
| vCB-N550 | 105 | 94.5 | 0 |
| pCB-2 | 0 | 10.5 | 105 |
| Paraffinic oil (Sunpar™ 2280) | 70 | 70 | 70 |
| Zinc Oxide | 5 | 5 | 5 |
| Stearic Acid | 1.5 | 1.5 | 1.5 |
| Tetramethylthiuram disulfide (TMTD) | 1 | 1 | 1 |
| Zinc dibenzyl dithiocarbamate (ZBDC) | 1.8 | 1.8 | 1.8 |
| MBTS | 3 | 3 | 3 |
| Sulfur | 0.8 | 0.8 | 0.8 |
| Total | 288.1 | 288.1 | 288.1 |

TABLE 23

EPDM Compound Evaluation (Confidence Intervals Expressed at 95%)

| | | Control | 10% Replacement | 100% Replacement |
|---|---|---|---|---|
| Rheometry (320° C.) | ts2 (min) | 3.12 | 3.07 | 2.98 |
| | t90 (min) | 9.63 | 9.75 | 10.29 |
| | ML Torque (dNm) | 1.24 | 1.49 | 1.23 |
| | MH Torque (dNm) | 17.17 | 18.38 | 18.19 |
| | Cure Time ts2 + 5 (min) | 14.6 | 14.8 | 15.3 |
| Tensile (psi) | Stress at 50% | 132 ± 0.4 | 140 ± 0.4 | 117 ± 0.4 |
| | Stress at 100% | 232 ± 0.8 | 247 ± 0.7 | 196 ± 0.7 |
| | Stress at 300% | 702 ± 1.1 | 655 ± 0.3 | 489 ± 0.5 |
| | Stress at Break | 1168 ± 1.9 | 1147 ± 2.8 | 1045 ± 1.5 |
| | Elongation at Break (%) | 521 ± 1.8 | 533 ± 1.9 | 578 ± 0.3 |
| Hardness (10 sec) | | 71.8 ± 0.08 | 72.1 ± 0.04 | 66.9 ± 0.09 |

The incorporation of pCB-batch 2 into the EPDM formulation did not have a considerable impact on the cure characterization values, even with full replacement. For example, the ts2 times are 3.12, 3.07 and 2.98 minutes for vCB, 10% and 100% pCB-2, respectively. The t90 times are reasonably close to one another. The tensile strength of the various samples was not significantly impacted when 10% of the N550 vCB was replaced with pCB-2 as evidenced by the comparable tensile strength and elongation at break values of 1168/1146 psi and 521/533%, respectively. However, when only pCB-batch 2 was used in the formulation a decline in material properties was observed with the same measurements giving 1044 psi and 578%. This was further corroborated by the hardness values of 72 recorded with both vCB and 10% pCB-2, but which decreased to 67 upon full replacement.

Overall, these results demonstrate that little to no change in material properties occurred with partial replacement of the medium reinforcing N550 vCB with pCB-2 in this automotive non-tire application, although complete replacement did have a negative impact.

Evaluation of "Dummy" Rubber Formulation Prepared with N330 or N550 vCB, Aged pCB-Batch 1, pCB-Batch 2

This study was performed based on the ASTM D3192 standard, which evaluates and highlights the effects of test filler materials, namely carbon black, in a basic "dummy" natural rubber compound. Formulations comprising aged pCB-batch 1 or pCB-batch 2 were benchmarked to those generated comprising N330 or N550 vCB. The aged pCB-batch 1 and pCB-batch 2 were compared to each other, and to the two vCB materials.

TABLE 24

ASTM D3192 Standard Test Formulation

| | |
|---|---|
| Natural Rubber | 100 |
| Stearic Acid | 3 |
| Zinc Oxide | 5 |
| Benzothiazyl Disulfide | 0.60 |
| Sulfur | 2.50 |
| Carbon Black | 50 |
| Total | 161.10 | more recently generated pCB-batch 2 does potentially represent an improvement with respect to certain material properties, indicating that some optimization of the pCB can be achieved. This was further corroborated in the present Example. Both Mooney scorch and rheometry experiments yielded times that were similar for the two pCB samples. For example, t35 Mooney scorch times were 29.1 and 27.8 minutes while ts2 values of 0.74 and 0.71 minutes were obtained for aged pCB-batch 1 and pCB-batch 2, respectively. A difference between the two materials became more apparent upon evaluating their contributions to tensile strength. The strength and elongation at break were different with values of 2153 and 2954 psi and 466 and 496% recorded, respectively. The DIN abrasion loss volumes were similarly disparate at 224 and 189 $cm^3$, confirming the superior reinforcing behaviour of pCB-2.

The material properties of compounds comprising N330 vCB considerably outperformed those of pCB-batch 2, while N550 vCB based materials were also superior but to a lesser extent. These results suggest that the present pCB may fall more into an N600-N700 class of carbon black, when used in this type of rubber composite. Supporting this is the larger tensile strength at break values of 4109 and 3573 psi for N330 and N550 vCB, respectively, along with lower abrasion loss volumes of 135 and 152 $cm^3$ compared to either pCB.

Overall, these results indicate that pCB-batch 1 and pCB-batch 2 are comparable filler materials. In addition, these results demonstrate that the more recent pCB-batch 2 functions better as a reinforcing carbon black. Although it is not likely to be a drop-in replacement for an N300-500 series of vCB, when used in this and similar rubber composites the present pCB does possess qualities that would make it more comparable to an N600-700 series.

Evaluation of Rubber Pad Compounds for Transit Applications Prepared with N660 or N774 vCB and pCB-Batch 2

TABLE 25

ASTM D3192 Rubber compound Evaluation

| | | vCB-N330 | vCB-N550 | aged pCB-batch 1 | pCB-batch 2 |
|---|---|---|---|---|---|
| Mooney Viscosity (212° F.) | MI | 123.60 | 103.80 | 76.00 | 80.40 |
| | ML | 70.30 | 61.60 | 51.10 | 55.00 |
| Mooney Scorch (250° F.) | ML | 58.30 | 47.70 | 34.10 | 40.60 |
| | t5 | 11.90 | 16.43 | 19.55 | 19.50 |
| | t35 | 16.88 | 22.09 | 29.10 | 27.76 |
| Rheometry (350° F.) | ML | 2.27 | 1.73 | 1.15 | 1.40 |
| | ts2 | 0.53 | 0.64 | 0.74 | 0.71 |
| | t50 | 0.93 | 1.14 | 1.00 | 0.97 |
| | t90 | 2.49 | 2.76 | 2.28 | 2.35 |
| | MH | 12.91 | 12.38 | 8.68 | 9.05 |
| Tensile (psi) (300° F./30 min) | Tensile at Break | 4109 | 3573 | 2153 | 3573 |
| | Elongation at Break (%) | 542 | 495 | 466 | 495 |
| | Tensile at 100% | 372 | 425 | 252 | 274 |
| | Tensile at 200% | 995 | 1119 | 607 | 666 |
| | Tensile at 300% | 1887 | 1985 | 1090 | 1319 |
| Tear Resistance (lb/in) | | 758 | 458 | 130 | 132 |
| Durometer Hardness | | 65.0 | 62.0 | 53.0 | 55.0 |
| Flexometer (300° F.) | Hysteresis (° F.) | 28 | 23 | 19 | 23 |
| | Blowout Minutes | 9.4 | 11.1 | 7.5 | 7.4 |
| DIN Abrasion Loss (300° F.) ($mm^3$) | | 134.7 | 152.0 | 224.2 | 189.2 |
| Dispersion | | X = 7.30 | X = 8.50 | X = −1.85 | X = 0.44 |
| | | y = 9.90 | y = 9.97 | Y = −0.63 | Y = 2.35 |
| Rebound/Resilience (300° F.) | | 47.0 | 54.0 | 58.0 | 52.0 |

As was previously identified by the above Examples, comparative studies employing aged pCB-batch 1 and pCB-batch 2 indicated batch-to-batch consistency although the Rubber pad compounds used for vibration dampening in the railway sector (e.g., subway) were generated and tested using N660 or N774 vCB and pCB-batch 2.

TABLE 26

Vibration Dampening (Rail Pad) Compound Formulation

|  | vCB-N660 | vCB-N774 | pCB-batch 2 |
|---|---|---|---|
| RSS1 (ribbed smoked sheet) | 100 | 100 | 100 |
| Zinc Oxide | 5 | 5 | 5 |
| Antiozonant (Santoflex ™ 13) | 3 | 3 | 3 |
| Sunproof improved wax | 2 | 2 | 2 |
| Zinc 2-ethyl-hexanoate | 1 | 1 | 1 |
| N660 vCB | 20 | — | — |
| N774 vCB | — | 20 | — |
| p-CB-batch 2 | — | — | 20 |
| 2-Benzothiazolyl-N-morpholinosulfide, (MOR) | 1.2 | 1.2 | 1.2 |
| Bis(dibutylthiocarbomyl) disulfide (TBTD) | 0.5 | 0.5 | 0.5 |
| DPG | 0.5 | 0.5 | 0.5 |
| Sulfur | 0.5 | 0.5 | 0.5 |
| Total | 133.7 | 133.7 | 133.7 |

TABLE 27

Vibration Dampening (Rail Pad) Compound Evaluation

| | | vCB-N660 | vCB-N774 | pCB-batch 2 |
|---|---|---|---|---|
| Mooney | MI | 61.9 | 66.8 | 66 |
| Viscosity (212° F.) | ML | 47.3 | 50.6 | 50.2 |
| Mooney Scorch (280° F.) | ML | 36.8 | 39.6 | 38.7 |
|  | t5 | 10.71 | 10.74 | 13.21 |
|  | t35 | 13.17 | 13.23 | 16.1 |
| Mooney Scorch (248° F.) | ML | 41.8 | 44.2 | 43.6 |
|  | t5 | 30.99 | 30.46 | 40.97 |
|  | t35 | 35.83 | 35.23 | 46.5 |
| Rheometry (375° F.) | ML | 1.18 | 1.25 | 1.22 |
|  | ts2 | 0.52 | 0.53 | 0.55 |
|  | t50 | 0.55 | 0.56 | 0.59 |
|  | t90 | 0.78 | 0.79 | 0.82 |
|  | MH | 6.51 | 6.39 | 6.38 |
| Rheometry (384° F.) | ML | 1.52 | 1.4 | 1.6 |
|  | ts2 | 8.61 | 8.74 | 11.02 |
|  | t50 | 9.35 | 9.47 | 11.81 |
|  | t90 | 13.85 | 14 | 16.91 |
|  | t95 | 16.62 | 16.84 | 19.76 |
|  | MH | 8.05 | 7.72 | 8.03 |
| Tensile (psi) (300° F.) | Tensile | 4260 | 4026 | 4299 |
|  | Elongation (%) | 645 | 649 | 646 |
|  | 300% Modulus | 699 | 588 | 638 |
| Die C Tear (300° F.) (lb/in) |  | 295 | 228 | 170 |
|  | Durometer | 45 | 44 | 44 |
|  | Density | 1.04 | 1.04 | 1.04 |
| Heat Aging (212° F./70 h) | ΔTensile (%) | −13 | −8 | −19 |
|  | ΔElongation (%) | −11 | −12 | −14.6 |
|  | ΔHardness | 2 | 2 | 2 |
| Fluid Resistance (212° F./70 h) | ΔTensile (%) | −17 | −19 | −28.6 |
|  | ΔElongation (%) | −14.3 | −16.3 | −15.3 |
|  | ΔHardness | 1 | 1 | 1 |
|  | ΔVolume (%) | 5.5 | 5.6 | 7.3 |
|  | ΔSample weight (%) | 5 | 4.9 | 6 |
| Compression Set[1] (%) |  | 22.6 | 23.4 | 25.1 |
| Compression Set[2] (%) (ASTM D1229) |  | 2 | 3 | 2.5 |
| Ozone Concentration (pphm) |  | Pass | Retesting | Pass |
| Flexometer (300° F.) | Hysteresis (° F.) | 11 | 7 | 8 |
|  | Blowout Minutes | 381.8 | 413.1 | 129.1 |
| Cut & Chip (300° F.) | Mass loss (%) | 12.8 | 13.6 | 17.4 |
|  | Dia. Loss (%) | 18.5 | 21.5 | 24 |
|  | Dispersion | x = 7.07 | x = 7.09 | x = 1.87 |
|  |  | y = 9.89 | y = 9.88 | y = 5.37 |

[1]The condition of the compression set of button: cure for 25 min/300° F. and age for 22 h/212° F.
[2]The condition of the compression set of button by ASTM D1229: cure for 25 min/300° F. and age for 70 h/14° F.

A slight reduction in cure rate was observed with pCB-batch 2 compared to the vCB samples. For example, the Mooney scorch t5 and t35 times were 2-3 minutes longer with the pCB-batch 2 (e.g., 13 versus 10 minutes), whereas the rheometric data suggested little difference between the three materials as essentially identical times were recorded. The tensile and elongation at break metrics were also quite similar between all three of the materials tested with pCB-batch 2's strength of 4299 psi comparing favourably to the more reinforcing N660vCB's 4260 psi. The same measurements conducted after heat aging at 212° F. for 70 hours showed a 19% decrease for the pCB-batch 2 material (minimum requirement is −15%), although the decrease in percent elongation and hardness fell within acceptable ranges.

The tear resistance for the pCB-batch 2 material was the lowest at 170 lb/in which was approximately 42% and 25% less than N660 and N774 vCB samples, respectively. Similarly, the fiexoraeter test revealed that the pCB-batch 2 compound had the shortest fatigue resistance when exposed to dynamic compressive strains. Finally, the cut and chip abrasion mass and diameter loss was the greatest with values of 1.7% and 24% measured with pCB-2 compared to 12/19% and 14/22% for N660 and N774, respectively.

Overall these results show that the pCB may not be able to directly substitute an N600 or N700 series of vCB in this specific rubber pad application. These results do, however, suggest that a portion of the N600 or N700 vCB could be successfully replaced with the pCB.

Evaluation of High Performance Elastomer Prepared with N550 and pCB-2

A hydrogenated nitrile butadiene rubber (HNBR) formulation, which finds application as a high performance elastomer, was generated and tested using M550 vCB or pCB-batch 2 (employing various phr values). This Example provides a comparison between materials made with identical loadings (phr=50) of carbon black.

TABLE 28

High Performance Elastomer Compound Formulation

|  | Control | Sample-1 | Sample-2 | Sample-3 |
|---|---|---|---|---|
| HNBR (Therban ™ 3407) | 100 | 100 | 100 | 100 |
| vCB-N 550 | 50 |  |  |  |
| pCB-2 |  | 30 | 50 | 70 |
| diphenylamine-based antidegradant (Luvomaxx ® CDPA) | 1 | 1 | 1 | 1 |
| zinc salt of 4- and 5-methyl-2-mercapto-benzimidazole (Vulkanox ® ZMB2) | 0.4 | 0.4 | 0.4 | 0.4 |
| MgO | 2 | 2 | 2 | 2 |
| Diplast 8-10 | 5 | 5 | 5 | 5 |
| triallylisocyanurate (70%, TAIC-70) | 2.1 | 2.1 | 2.1 | 2.1 |
| di(tert-butylperoxyisopropyl)benzene (Perkadox ™ 14-40) | 7 | 7 | 7 | 7 |
| Total | 167.5 | 147.5 | 167.5 | 187.5 |

TABLE 29

High Performance Elastomer Compound Evaluation

| | | Control | Sample-1 | Sample-2 | Sample-3 |
|---|---|---|---|---|---|
| Rheometry (180° C.) | S'min (dNm) | 2.16 | 1.62 | 2.67 | 3.4 |
| | S'max (dNm) | 27.91 | 20.84 | 27.46 | 31.37 |
| | S'end (dNm) | 27.71 | 20.73 | 27.34 | 31.15 |
| | ΔS' (dNm) | 25.75 | 19.22 | 24.79 | 27.97 |
| | ts1(s) | 28 | 34 | 31 | 28 |
| | ts2 (s) | 35 | 43 | 38 | 34 |
| | t50 (s) | 121 | 119 | 119 | 120 |
| | t90 (s) | 346 | 337 | 343 | 347 |
| | t95 (s) | 446 | 436 | 442 | 446 |
| Mooney Viscosity (100° C.) $ML_{1+4}$ | | 107 | 89 | 121 | 142 |
| Tensile at RT (MPa) | M10 | 0.7 | 0.5 | 0.7 | 0.9 |
| | M25 | 1.3 | 0.8 | 1.2 | 1.6 |
| | M50 | 2.2 | 1.2 | 2 | 2.8 |
| | M100 | 6.3 | 2.3 | 4.5 | 7.1 |
| | M300 | — | 13.2 | 20.3 | — |
| | EB (%) | 283 | 305 | 318 | 248 |
| | TS | 27.1 | 13.7 | 21.4 | 22.7 |
| | Hardness | 69 | 58 | 66 | 72 |
| Compression Set (%) (150° C./70 h) | | 27 | 26 | 30 | 34 |
| Goodrich Flexometer | Flowing (%) | −1.0 | −0.8 | −1.0 | −0.7 |
| | Permanent Set (%) | 0.4 | 0.8 | 0.4 | 0.8 |
| | Internal Temp. (° C.) | 158 | 148 | 161 | 172 |
| | Heat Buildup (K) | 37 | 24 | 33 | 41 |
| Tear Resistance (N/mm) | | 12.6 | 9.5 | 28.9 | 13.1 |
| Tensile (MPa) 3 day at 150° C. | M10 | 0.9 | 0.6 | 0.9 | 1.3 |
| | M25 | 1.6 | 1 | 1.7 | 2.5 |
| | M50 | 3 | 1.6 | 2.9 | 4.8 |
| | M100 | 8.1 | 3.4 | 6.6 | 11.1 |
| | M300 | — | 16.8 | — | — |
| | EB (%) | 270 | 324 | 275 | 179 |
| | TS | 26.2 | 19.2 | 22.3 | 21.1 |
| | Hardness | 73 | 63 | 72 | 79 |
| Tensile (MPa) 7 day at 150° C. | M10 | 1 | 0.6 | 1 | 1.6 |
| | M2 | 1.8 | 1.1 | 1.9 | 3.2 |
| | M50 | 3.5 | 1.9 | 3.6 | 6.4 |
| | M100 | 9 | 4.1 | 8 | 13.4 |
| | M300 | — | 17.8 | — | — |
| | EB (%) | 226 | 311 | 244 | 160 |
| | TS | 23.1 | 18.7 | 20.8 | 20.8 |
| | Hardness | 76 | 66 | 74 | 82 |
| Tensile (MPa) 21 day at 150° C. | M10 | 1.2 | 0.7 | 1.2 | 2.1 |
| | M25 | 2.4 | 1.3 | 2.5 | 4.8 |
| | M50 | 4.7 | 2.4 | 5.3 | 10.2 |
| | M100 | 11.9 | 5.9 | 11.8 | 20 |
| | M300 | — | — | — | — |
| | EB (%) | 187 | 236 | 168 | 93 |
| | TS | 23.4 | 16.9 | 19.6 | 18.7 |
| | Hardness | 79 | 68 | 78 | 86 |

Note:
Samples cured at 180° C. for 15 minutes.

Direct replacement of vCB with pCB-batch 2 did not have any noticeable effect on the cure as indicated by the rheometric data. The ts2 and t.90 cure times for the two materials were 35/38 minutes and 346/343 minutes, respectively. Without wishing to be bound by theory, the larger Mooney viscosity value of 121 for pCB-batch 2, compared to 107 for vCB, may suggest greater structure or polarity in the pCB comprising that material. Overall it suggests that pCB-batch 2 was more reinforcing in this application. Surprisingly, the tensile measurements somewhat conflict with this as a greater tensile strength at break was measured for the vCB material at 27.1 MPa relative to 21.4 MPa for pCB-2. These observations could be attributed to a greater particle size distribution in pCB-batch 2; regardless, these results demonstrate that the present pCB can be successfully incorporated in a high performance elastomer to replace all or a portion of vCB.

This HNBR compound is a high value rubber given its current use in demanding thermal and mechanical applications. For example, it is used in under the hood applications (e.g. belts and hosing) and is therefore stable at 150° C. In order to gauge the properties of these materials comprising the different carbon black fillers under these conditions, a hot-air experiment was conducted where the compounds were heated to 150° C. for 3, 7 and 21 days followed by measuring their tensile strength for any degradation. At 3 days, the vCB and pCB-batch 2 materials had strength at break values of 26.2 and 22.3 MPa, respectively. For both compounds, these decreased after 7 days to 23.1 and 20.8 MPa, which corresponded to percent differences of −12.6 and −7.0%. However, after 21 days the vCB compound remained essentially constant at 23.4 MPa, while pCB-batch 2 decreased by 5.9% to 19.6 MPa. Although these results are slightly worse for pCB-batch 2, they are still very encouraging and are acceptable for HNBR materials. Furthermore, the results suggest a fairly low acid content in the pCB sample, which is preferred since acid will catalyze material degradation under such forcing conditions.

The hardness values were very similar between the two materials with values of 69 and 66 for vCB and pCB-batch 2, respectively. The compression set after heating to 150° C. for 70 hours was 27% and 30%, respectively, both of which fall within the acceptable range of 20-30%. Remarkably, the recorded tear resistance for the pCB-batch 2 material was exceptionally high at 28.9 N/mm compared to that of vCB at 12.6 N/mm.

Overall, these results indicate that the pyrolytic carbon black described herein can act as a drop in replacement in this particularly demanding high performance elastomer used primarily in the automotive industry.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. An elastomeric composition comprising at least one elastomer and a reclaimed pyrolyzed carbon black (pCB), wherein the pCB comprises less than about 10 µg/g of polycyclic aromatic hydrocarbons (PAH).

2. The composition of claim 1, wherein the pCB comprises less than about 5 µg/g of PAH.

3. The composition of claim 1, wherein the elastomer comprises at least one of a homo- or co-polymer of 1,3 butadiene, styrene, isoprene, isobutylene, 2,3-dimethyl-1,3-butadiene, acrylonitrile, ethylene, propylene or blends thereof.

4. The composition of claim 1, wherein the elastomer comprises at least one of styrene-butadiene rubber (SBR), natural rubber, halogenated rubbers, silicone, phosphazene, thionylphosphazene, fluoropolymers, polyolefins, polyesters, nylon, polyamides, polybutadiene, polyisoprene, their oil-extended derivatives or blends thereof.

5. The composition of claim 1, further comprising at least one coupling agent.

6. The composition of claim 5, wherein the coupling agent comprises at least one of a silane coupling agent, a zirconate coupling agent, a titanate coupling agent and a nitro coupling agent.

7. The composition of claim 6, wherein the silane coupling agent is bis(3-triethoxysilylpropyl)tetrasulfane, 3-thiocyanatopropyl -triethoxy silane, or γ-mercaptopropyltrimethoxysilane.

8. The composition of claim 6, wherein the zirconate coupling agent is dineopentyl(diallyl)oxy di(3-mercapto) propionic zirconate.

9. The composition of claim 6, wherein the nitro coupling agent is N,N'-bis(2-methyl-2-nitropropyl)-1,6-diaminohexane.

10. The composition of claim 1, further comprising an organic or inorganic filler.

11. The composition of claim 1, comprising at least one of a curing agent, a reinforcing filler, a coupling agent, a processing aid, an oil extender, an accelerant, an antioxidant and an antidegradant.

12. The composition of claim 1, further comprising virgin carbon black.

13. A composite material comprising the composition of claim 1 and a reinforcing material.

14. The composite material of claim 13, which is a tire composite used as a tire component.

15. The composite material of claim 14, wherein the tire component comprises at least one of a tread, wirecoat, beadcoat, sidewall, inner liner, apex, chafer and plycoat.

16. The composite material of claim 13, which is one of a belt and a hose.

* * * * *